United States Patent [19]

Giolito et al.

[11] 4,403,056
[45] Sep. 6, 1983

[54] CARBONATE ESTERS, CARBONATE ESTER COMPOSITIONS, AND PLASTICIZED COMPOSITIONS

[75] Inventors: Silvio L. Giolito, Whitestone; Jagadish C. Goswami, New City; Edward D. Weil, Hastings-on-Hudson, all of N.Y.

[73] Assignee: Stauffer Chemical Company, Westport, Conn.

[21] Appl. No.: 228,780

[22] Filed: Jan. 30, 1981

Related U.S. Application Data

[63] Continuation-in-part of Ser. No. 120,459, Feb. 11, 1980, abandoned.

[51] Int. Cl.³ .................. C08K 5/10; C08L 27/06; C07C 68/00; C07C 69/96
[52] U.S. Cl. .................. 524/280; 260/463
[58] Field of Search .................. 260/31.2 R, 463; 524/280

[56] References Cited

U.S. PATENT DOCUMENTS 3,326,958  6/1967  Curtius et al. .................. 260/463
3,405,148  10/1968  Thompson .................. 260/463
4,146,522  3/1979  Heckles .................. 260/29.1 R

FOREIGN PATENT DOCUMENTS 961999  1/1975  Canada .................. 260/463
2736062  2/1979  Fed. Rep. of Germany ...... 260/463

OTHER PUBLICATIONS

F. C. McKay et al., JACS, vol. 79, 4686–4690.
C. Abstract, vol. 72, entry 56322k, U.S.S.R. 248, 203.

Primary Examiner—Joseph L. Schofer
Assistant Examiner—Peter F. Kulkosky
Attorney, Agent, or Firm—Richard P. Fennelly

[57] ABSTRACT

A carbonate ester of the formula:

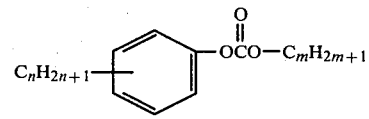

where n is an integer of from 0 to 4 and m is an integer of from 8 to 14 and carbonate ester compositions containing at least one of such compounds are disclosed. These compounds or compositions can be added to vinyl chloride polymer compositions to plasticize said compositions.

18 Claims, No Drawings

CARBONATE ESTERS, CARBONATE ESTER COMPOSITIONS, AND PLASTICIZED COMPOSITIONS

CROSS REFERENCE TO RELATED APPLICATION

This application is a continuation-in-part of U.S. Ser. No. 120,459, filed Feb. 11, 1980 abandoned.

BACKGROUND OF THE INVENTION

2. Field of the Invention

The present invention relates to carbonate esters, carbonate ester compositions, and to plasticized vinyl chloride polymer compositions containing them.

2. Description of the Prior Art

Various organocarbonates are known to the prior art, and some are taught as being useful as plasticizers in vinyl chloride polymer compositions.

For example, U.S. Pat. No. 4,146,522 to J. S. Heckles shows various dialkyl carbonates and monoalkyl monoalkoxyalkyl carbonates and teaches that they are useful as plasticizers for vinyl chloride polymers.

Certain other prior art references show the use of symmetrical phenyl group-containing carbonates as plasticizers. For example, U.S.S.R. Pat. No. 248,203 shows the use of diphenyl carbonate as a plasticizer for vinyl chloride polymers. Also, Belgian Pat. No. 776,193 shows bis(carboxyphenyl)carbonates and also suggests their use as plasticizers.

In addition to the foregoing, certain other references mention other organocarbonates which are not, however, suggested for use as plasticizers in vinyl chloride polymer compositions. Canadian Patent No. 961,999 describes certain dialkylaryl and dialkoxyaryl carbonates which are described as being useful as stabilizers, but not plasticizers, in vinyl chloride polymer compositions. The Kirk-Othmer Encyclopedia of Chemical Technology, Third Edition, Vol. 4, pp. 766-770 (John Wiley and Sons, New York, 1979) describes mixed alkyl aryl carbonate esters, for example, ethyl phenyl carbonate, without indicating that they can be used as plasticizers.

SUMMARY OF THE PRESENT INVENTION

The present invention relates to carbonate ester compounds of the formula:

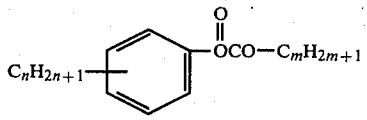

where n is an integer of from 0 to 4 and m is an integer of from 8 to 14 and to compositions containing at least one of such compounds. The present invention also relates to plasticized vinyl chloride polymer compositions containing these carbonate ester compositions.

Detailed Description of Preferred Embodiments

The alkyl aryl carbonates of the present invention are of the formula:

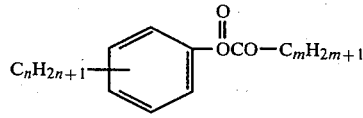

where n is an integer of from 0 to 4 and m is an integer of from 8 to 14. The alkyl groups represented by the designations $C_nH_{2n+1}$ and $C_mH_{2m+1}$ can be either straight or branched chain. Some compounds which fall within this definition are: isopropylphenyl 2-ethylhexyl carbonate; phenyl 2-ethylhexyl carbonate; isopropylphenyl isodecyl carbonate; phenyl isodecyl carbonate; isopropylphenyl tridecyl carbonate; and phenyl tridecyl carbonate.

The compounds and compositions of the present invention can be formed by reacting a phenol or a phenol composition comprising at least one compound of the formula:

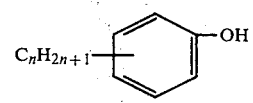

where n is defined as above, in an inert organic solvent containing a quantity of an acid acceptor, e.g., an alkaline earth hydroxide or an amine, with an alkyl halocarbonate (alkyl haloformate) of the formula $C_mH_{2m+1}OC(O)X$, where X is halogen, e.g., chlorine. Details regarding this general type of conventional reaction between phenols and chloroformates to form carbonate esters is given in the Kirk-Othmer Encyclopedia of Chemical Technology, Third Edition, Vol. 4, p. 761 and by German Pat. No. 857,806 to I. G. Farbenindustrie A. G. which are each incorporated herein by reference. When a pure phenol is the starting material, a pure alkyl aryl carbonate ester results. When a phenol mixture is used, an alkyl aryl carbonate ester composition containing more than one ester isomer results. Alternatively, the synthesis could be carried out by reacting an aryl or alkylaryl halocarbonate and an alkyl alcohol.

A more preferred reaction, which does not use either a solvent reaction medium or an amine acid acceptor, comprises reacting the phenol or phenol composition with phosgene to form an arylhaloformate intermediate and then reacting the arylhaloformate with the desired $C_8$-$C_{14}$ alcohol to yield the desired carbonate ester or carbonate ester composition. The reaction of phenol or phenol composition and excess phosgene to form the arylhaloformate is preferably carried out at elevated temperature (e.g., 50°-125° C.) in the presence of a suitable catalyst (e.g., a polymeric resin or amine). The reaction is terminated when phosgene is visible in the condenser portion of the reaction vessel. This type of reaction is known and is described in such patents as U.S. Pat. Nos. 3,170,946 and 3,211,774 to 776. The arylhaloformate intermediate resulting from this reaction step is then reacted with a desired $C_8$-$C_{14}$ alcohol to yield the desired alkyl aryl carbonate ester. This second reaction step is preferably conducted by the continuous addition of alcohol to the arylhaloformate intermediate, with the application of heat, if desired.

The carbonates and carbonate compositions which are the subject of the present invention are useful as plasticizers for vinyl chloride polymers. Representative polymers include polyvinyl chloride homopolymer, as well as those vinyl chloride copolymers comprising at least 50%, by weight, vinyl chloride copolymerized with a copolymerizable monomer, such as vinyl acetate, styrene, acrylonitrile, the alkyl acrylates and methacrylates, and so forth. The carbonates and carbonate compositions of the present invention can be present at from about 5% to about 50%, by weight of the vinyl chloride polymer. Other conventional functional additives normally used in plasticized vinyl chloride polymer compositions (e.g., heat stabilizers, lubricants, colorants, flame retardants, fillers, antioxidants, processing aids, impact modifiers, and the like) can also be used in conventional amounts.

The carbonate compounds and compositions of the present invention can be used to plasticize vinyl chloride polymer compositions, for example, in forming calenderable film forming compositions or plastisols. In plastisol applications, for example, they have been found capable of yielding vinyl plastisols having lowered viscosity values and improved viscosity stability compared to dioctyl phthalate. It has also been found that they are capable of producing plasticized vinyl chloride polymer compositions having a greater degree of flame retardance, a lower degree of smoke generation, and an unexpectedly greater resistance to staining by certain substances (for example, lipstick, mustard, and coal tar) than certain conventional dialkyl phthalate plasticized vinyl chloride polymer compositions.

When a mixture of a phenyl alkyl carbonate ester and an alkyl phenyl alkyl carbonate ester are contained in the compositions, and it is desired that these compositions have a lowered volatility so as to have a longer degree of permanence in the vinyl chloride compositions, it has been found that the rate of exudation of the composition can be lowered by having a higher proportion of the phenyl alkyl carbonate ester in the mixture. This can be accomplished by insuring that the phenol mixture used in synthesizing these compositions comprises a higher proportion of unalkylated phenol.

The present invention is further illustrated by the Examples which follow.

EXAMPLE 1

This Example illustrates the synthesis of a composition comprising isopropylphenyl 2-ethylhexyl carbonate and phenyl 2-ethylhexyl carbonate.

A solution of 240 gm. of a composition comprising about 46%, by weight, of an isopropylphenol mixture (19.7% ortho; 23.6% meta- and para-; 1.3% 2,6 di-; 7.0% 2,4 di-; 1.5% 2,5- and 3,5 di-; and 0.3% 2,4,6 tri-) and about 54%, by weight phenol, 14.7 gm. of triethylamine catalyst, and 721 gm. of toluene was mixed with 138.9 gm. of calcium hydroxide, stirred continuously, and maintained at a temperature of 10° C. to 20° C. for about 40 minutes while 384.6 gm. of 2-ethylhexyl chloroformate was added dropwise to the solution. The reaction mixture was stirred for about two additional hours at room temperature, was filtered to remove inorganic solids, and the filter cake was washed with 200 ml. of toluene, the washings being added to the filtrate. The toluene was then distilled off, and the product was distilled such that about 467 gm. of product distilled in the temperature range of 123° to 163° C. at 1 mm. Hg pressure. The product was a liquid having the following physical properties: $n_d^{25°} = 1.4777$; $d^{25°} = 0.97$; APHA color = 15; Acid No. = less than 0.10 mg. KOH/gm. It comprised about 46%, by weight, isopropylphenyl 2-ethylhexyl carbonate and about 54%, by weight, phenyl 2-ethylhexyl carbonate.

EXAMPLE 2

This Example shows the use of the composition of Example 1 as a plasticizer for polyvinyl chloride as compared to a conventionally used plasticizer, dioctyl phthalate (abbreviated "DOP").

Initially, the following plastisol composition was formed by mixing the following ingredients at 23° C. in a three-roll paint mill until homogeneous:

| Ingredient | Parts by Weight |
|---|---|
| PVC homopolymer dispersion resin | 100 |
| Plasticizer | 60 |
| Heat stabilizer | 2 |

The plasticizer that was selected in the control formulation was dioctyl phthalate, whereas the other formulation contained the composition from Example 1. The following plastisol viscosities, in poises, (Brookfield Viscometer RVF, Spindle No. 6, at 2/20 rpm.) were noted. Lower viscosity values are preferred.

| Plasticizer | Initial | 2 Hours | 24 Hours |
|---|---|---|---|
| DOP | 20/19 | 40/26 | 60/38 |
| Comp. from Ex. 1 | 15/5 | 15/5 | 15/5 |

These data illustrate the superior effect of the composition of Example 1 on the initial viscosity values, and also show the superior viscosity stability of the plastisol composition containing it as compared to a composition containing dioctyl phthalate.

EXAMPLE 3

This Example illustrates certain of the physical properties for two vinyl films formed by fusing each of the plastisols of Example 2 at a temperature of about 204° C. in an air circulating oven to yield films having a thickness of about 0.38 mm. The following Tables set forth the flame retardancy, smoke generation, and stain resistance qualities:

| Characteristic | Film Containing | |
|---|---|---|
| | DOP | Cpd. of Ex. 1 |
| Limiting Oxygen Index | 23.6 | 26.1 |
| NBS Smoke Chamber (Smoldering Mode) | 78 | 57 |
| Lipstick Stain Resistance | Poor | Very Good |
| Mustard Stain Resistance | Poor | Very Good |
| Coal Tar and Coal Tar/ Ashphalt Stain Resistance | Poor | Very Good |

The Limiting Oxygen Index gives a measure of the percent oxygen in an oxygen-nitrogen mixture which will just sustain combustion of a vertically mounted specimen that has been ignited by application of an external gas flame to its upper end. Higher values are indicative of a more fire resistant specimen.

The NBS Smoke Chamber contains a radiant heater producing 2.5 W/cm.$^2$ of heat at the surface of a 7.62 cm. × 7.62 cm. sample, a propane-air-pilot burner, and a vertical beam of light with a photomultiplier tube detector and microphotometer to record the attenuation of light by smoke developing in the chamber. During smoke testing, the chamber is sealed to enclose the combustion products and smoke. The tests were conducted under the smoldering mode, and the values that are given represent the maximum specific optical density that was recorded per unit weight of sample. Lower numbers are indicative of a sample that has a lower degree of smoke generation per unit weight.

Stain resistance to lipstick, mustard, coal tar and coal tar/asphalt was measured by putting a drop of each of the above mentioned stainants on top of the vinyl film for 30 minutes (for coal tar and coal tar/asphalt) and 24 hours (for lipstick and mustard), respectively, followed by wiping off of the stainant from the film by using a naphtha solvent. The stain resistance of the films was then determined qualitatively by visual observation. A "fail" or "very poor" rating was given if the naphtha did not remove the stain. A "very good" or "pass" rating was given if the stain was removed.

EXAMPLE 4

This Example illustrates the formation of two calenderable films, the first containing the composition of Example 1 as the plasticizer and the second containing a commercially available alkyl phthalate plasticizer formulation (711 PHTHALATE brand).

After fluxing the formulation described below on a two-roll heated mill at about 168.3° to 171.1° C. for 7 minutes, the resulting stocks were compression molded at 160° C. to produce films having a thickness of about 0.09 cm. to 0.12 cm. for measurement of physical properties according to various standard testing procedures.

| Ingredient | Amount by Weight |
|---|---|
| PVC homopolymer suspension resin | 100 |
| Plasticizer | 50 |
| Heat Stabilizer | 1.5 |
| Stearic acid lubricant | 0.5 |

The following physical properties were noted for the films:

| | Film Containing | |
|---|---|---|
| Property | Comp. of Ex. 1 | Commercial Phthalate |
| Clash-Berg Temperature (°C.) | −25 | −31 |
| Tensile Str. at Break (kg./cm.$^2$) | 201.3 | 172.3 |
| % Elongation at Break | 287 | 259 |
| Shore "A" Hardness | 77 | 81 |

The Clash-Berg point is the temperature at which the apparent modulus of elasticity of the specimen is 9491.4 kg/cm.$^2$ and is the end of flexibility of the sample as defined by Clash and Berg in their studies of low temperature flexibility. Lower values indicate a sample having a superior degree of low temperature flexibility.

The tensile strength at break is the maximum tensile stress sustained by a specimen during a tension test (ASTM D-882). The result is expressed in kg./cm.$^2$ with the area being that of the original specimen at point of rupture.

Percent elongation of break is the increase in distance between two gauge marks on the specimen at rupture (ASTM D-882) divided by the original distance between the marks, the quotient being multiplied by 100.

Shore "A" hardness is a measure of indentation hardness and is determined on the Shore A durometer after 10 seconds (ASTM D-2240). This instrument comprises a spring loaded indentor point with a load of 822 grams projecting through a hole in a presser foot. The device has a scale which indicates the degree of penetration into the plastic beyond the face of the foot. The scale ranges from 0 (for 0.254 cm. penetration) to 100 (for zero penetration).

EXAMPLE 5

This Example illustrates the formation of another composition comprising isopropylphenyl 2-ethylhexyl carbonate and phenyl 2-ethylhexyl carbonate.

The following reagents were added to a suitable reaction vessel:

| Reagent | Amount |
|---|---|
| Phenol composition* | 80 gm. |
| Pyridine | 58.8 gm. |
| Toluene | 600 ml. |

*comprised 46% by weight of the isopropylphenol mixture and 54%, by weight of phenol as used in Example 1.

To this mixture was then added in dropwise fashion 128.2 gm. of 2-ethylhexyl chloroformate at a temperature of about 10°–15° C. with stirring. At the termination of the reaction, the mixture was filtered and the toluene solvent was removed as in Example 1. The product distilled at 140°–175° C. at 1 mm. Hg. The product had the following physical properties: $d^{25°}=0.96$; $n_d{}^{25°}=1.4778$; APHA color=50 and Acid No.=<0.10. (The APHA color was determined by using the American Public Health Association's platinum-cobalt scale for designating color as described in Standard Methods for the Examination of Water and Sewage, 8th ed., American Public Health Association, 1936, p. 12.) It comprised about 46% isopropylphenyl 2-ethylhexyl carbonate and about 54% by weight of phenyl 2-ethylhexyl carbonate.

EXAMPLE 6

This Example illustrates another synthesis of a composition comprising isopropylphenyl 2-ethylhexyl carbonate and phenyl 2-ethylhexyl carbonate.

The following reagents were added to a suitable reaction vessel:

| Reagent | Amount |
|---|---|
| Phenol composition* | 240.0 gm. |
| Triethylamine | 14.7 gm. |
| Calcium hydroxide | 138.9 gm. |
| Toluene | 721.2 gm. |

*comprised about 46%, by weight, of the isopropylphenol mixture and about 54%, by weight of phenol as used in Example 1.

To this mixture was then added in dropwise fashion 384.6 gm. of 2-ethylhexyl chloroformate at a temperature of about 10°–15° C. for about 40 minutes with stirring. The mixture was filtered, and the filter cake was washed with toluene which was removed by distillation. The product was distilled at a temperature of about 123°–162° C. at 1.0 mm. Hg. pressure, and had the following physical properties: $d^{25°}=0.97$; $n_d{}^{25°}=1.4777$; APHA color=15. The composition comprised about 46%, by weight, of isopropylphenyl 2-ethylhexyl carbonate and about 54%, by weight, of phenyl 2-ethylhexyl carbonate.

EXAMPLE 7

This Example illustrates another synthesis of a composition comprising isopropylphenyl 2-ethylhexyl carbonate and phenyl 2-ethylhexyl carbonate.

| Reagent | Amount |
| --- | --- |
| Phenol composition* | 241 gm. |
| Pyridine catalyst | 11 gm. |
| Calcium hydroxide | 139 gm. |
| Toluene | 721 ml. |

*comprised about 54%, by weight, of the isopropylphenol mixture and about 46%, by weight, of phenol as used in Example 1.

To the above mixture was then added in dropwise fashion about 383 gm. of 2-ethylhexyl chloroformate at a temperature of about 15° C. for about 90 minutes with stirring. The mixture was allowed to stand for 15 minutes. The mixture was then filtered, and the filter cake was washed with toluene, which was removed by distillation. The product was distilled at a temperature of 123°-160° C. at 1.0 mm. of Hg pressure, and had the following physical property: APHA Color=25. The composition comprised about 54%, by weight, of isopropylphenyl-2-ethylhexyl carbonate and about 46%, by weight, of phenyl 2-ethylhexyl carbonate.

EXAMPLE 8

This Example illustrates the viscosity data and Limiting Oxygen Index (LOI) which was obtained for various plastisols and films, respectively, containing certain of the carbonate compositions of the present invention. The plastisol was formed as described in Example 2. The Limiting Oxygen Index (LOI) was determined as described in Example 3.

| Plasticizer | 24 hour Viscosity Values (poises) | LOI |
| --- | --- | --- |
| Dioctyl Phthalate[1] | 60/38 | 23 |
| Dioctyl Phthalate[2] | 80/45 | — |
| Carbonate Composition (from Example 5)[1] | 15/5 | 26.1 |
| Carbonate Composition (from Example 6)[2] | 25/13 | 26.8 |
| Carbonate Composition (from Example 7)[2] | 20/8 | 25.7 |

[1]with a barium-cadmium-zinc phenate heat stabilizer (MARK BB)
[2]with a barium-cadmium-zinc phenate heat stabilizer (KCB)

These data show that the carbonate compositions of the present invention yield plastisols having a lower viscosity than corresponding dioctyl phthalate plastisols and that films made from these plastisols have a superior Limiting Oxygen Index.

EXAMPLE 9

This Example compares the volatility and stain resistance characteristics of films made from the second dioctyl phthalate-containing formulation listed in the Table of the preceding Example and the last carbonate composition (from Example 7):

| Plasticizer | Volatility (% Wt. loss) | Strain Resistance |
| --- | --- | --- |
| Dioctyl Phthalate | 0.13 | Fail |
| Carbonate Composition (from Ex. 7) | 12 | Pass |

Volatility was measured by exposing the liquid material in a forced air oven at 104° C. for 3 hours and then measuring the weight loss.

Stain resistance was measured as described in Example 3. A "fail" rating means that the stain resistance was judged to be "poor". A "pass" rating indicates a "very good" stain resistance rating.

EXAMPLE 10

This Example illustrates the formation of a composition comprising isopropylphenyl 2-ethylhexyl carbonate and phenyl 2-ethylhexyl carbonate.

The following reagents were charged to a suitable reaction vessel:

| Reagent | Amount |
| --- | --- |
| Phenol composition* | 80 gm. |
| Triethylamine | 4.9 gm. |
| Calcium hydroxide | 46.1 gm. |
| Toluene | 240.1 gm. |

*Comprised about 54%, by weight, of the isopropylphenol mixture and about 46%, by weight, of phenol as used in Example 1.

To this mixture was then added, in dropwise fashion, 128.2 gm. of 2-ethylhexyl chloroformate at a temperature of about 10°-15° C. for about 25 minutes with stirring. The mixture was filtered, and the filter cake was washed with 125 ml. of toluene. The resulting mixture was then distilled to remove the toluene. The product distilled at a temperature of about 130°-163° C. at 1.0 mm. Hg, and had the following physical properties: $d^{25°}=0.98$; $n_d^{25°}=1.4780$; APHA color=35; and Acid No.=0.07. It comprised about 54%, by weight, of isopropylphenyl 2-ethylhexyl carbonate and about 46%, by weight, of phenyl 2-ethylhexyl carbonate.

EXAMPLE 11

This Example illustrates the synthesis of a composition comprising isopropylphenyl 2-ethylhexyl carbonate and phenyl 2-ethylhexyl carbonate.

The following reagents were added to a suitable reaction vessel:

| Reagent | Amount |
| --- | --- |
| Phenol Composition* | 276 gm. |
| Pyridine | 166 gm. |
| Toluene | 500 ml. |

*Comprised about 83.1%, by weight, if isopropylphenol mixture and about 16.9%, by weight of phenol. The isopropylphenol mixture comprised 44.54% meta- and para-; 19.99% 2,4 di-; 11.18% ortho; and 7.37% 2,6 diisopropyl phenol.

To this mixture was then added in dropwise fashion, with stirring, at 5° C. about 385 gm. of 2-ethylhexyl chloroformate over a period of about 1.5 hours. The mixture was filtered, and the filter cake was washed with 200 cc. of toluene. The washed filter cake was then washed with 1000 ml. of 1 N hydrochloric acid. After one hour, the mixture was washed with 1000 ml. of water and then with 1000 ml. of a 1%, by weight, sodium hydroxide solution. The aqueous solvent was then stripped from the solution to yield a product having the following physical properties: $n_d{}^{25°}=1.4780$; Acid No. 0.028; APHA Color=100; boiling point=154°-166° C. at 1.25 mm. Hg. This composition comprised about 79%, by weight, of isopropylphenyl 2-ethylhexyl carbonate and 21% of phenyl 2-ethylhexyl carbonate.

The product was redistilled in a packed fractionating column at 119°-151° C., at 0.5 mm. Hg, to yield a product having the following physical properties: $n_d{}^{25°}=1.4780$; Acid No.=0.03; and APHA Color=50.

EXAMPLE 12

This Example illustrates the synthesis of a composition comprising isopropylphenyl isodecyl carbonate and phenyl isodecyl carbonate.

The following reagents were added to a suitable reaction vessel:

| Reagent | Amount |
| --- | --- |
| Phenol Composition* | 276 gm. |
| Pyridine | 166 gm. |
| Toluene | 500 ml. |

*Comprised about 83.1%, by weight, of isopropylphenol and about 16.9%, by weight, of phenol from Example 11.

To this mixture was then added in dropwise fashion 441.0 gm. of isodecyl chloroformate at 0°-5° C. over a period of 105 minutes. The reaction mixture was allowed to stand for the remainder of the day. Then the mixture was filtered, and the filter cake was washed sequentially with 1000 ml. of a 1 N hydrochloric acid solution, 1000 ml. of water, and 1000 ml. of a 1%, by weight, sodium hydroxide solution. The toluene solvent that remained was removed by vacuum distillation, and the product was distilled at 179° to 196° C. at 0.20 mm. Hg. It had the following physical properties: $n_d{}^{25°}=1.4756$; APHA color=25 and Acid No.=0.014. It comprised about 79%, by weight, of isopropylphenyl isodecyl carbonate and about 21% phenyl isodecyl carbonate.

EXAMPLE 13

This Example illustrates the synthesis of a composition comprising isopropylphenyl isodecyl carbonate and phenyl isodecyl carbonate.

The following reagents were added to a suitable reaction vessel:

| Reagent | Amount |
| --- | --- |
| Phenol Composition* | 232 gm. |
| Pyridine | 79.1 gm. |
| Toluene | 500 ml. |

*Comprised about 55%, by weight, of an isopropylphenol mixture (23.4% meta- and para-; 19.46% ortho-; 9.98% 2,4 di- and 2,5 di-; 1.59% 2,6 di-; and 0.03% 2,4,6 tri-) and about 45%, by weight, of phenol.

To this mixture was then added in dropwise fashion 441.0 gm. of isodecyl chloroformate at 5° C. over a period of 80 minutes. The reaction mixture was allowed to stand for the remainder of the day. Then the mixture was filtered, and the filtrate cake was washed sequentially with 1000 ml. of a 1 N hydrochloric acid solution, 1000 ml. of water, and 1000 ml. of a 1%, by weight, sodium hydroxide solution. The toluene solvent that remained was removed by vacuum distillation, and the product was distilled at 160° to 180° C. at 2.0 mm. Hg. The product had the following physical properties: $n_d{}^{25°}=1.4743$; and and APHA Color=25. It comprised about 48%, by weight, of isopropylphenyl isodecyl carbonate and about 52%, by weight, of phenyl isodecyl carbonate.

EXAMPLE 14

This Example illustrates the synthesis of a composition comprising isopropylphenyl tridecyl carbonate and phenyl tridecyl carbonate.

The following reagents were added to a suitable reaction vessel:

| Reagent | Amount |
| --- | --- |
| Phenol Composition* | 232 gm. |
| Pyridine | 166 gm. |
| Toluene | 500 ml. |

*Comprised about 55%, by weight, of the isopropylphenol mixture and about 45%, by weight, of phenol as used in Example 13.

To this mixture was then added in dropwise fashion 525 gm. of tridecyl chloroformate at 0°-5° C. over a period of one hour. The reaction was allowed to proceed at room temperature for about an additional 3 hours. The mixture was filtered, and the filter cake was washed with 200 ml. of toluene. The resulting mixture was then washed sequentially with 1000 ml. of 1 N hydrochloric acid, 1000 ml. of water, 1000 ml. of a 1% sodium hydroxide solution, and 1000 ml. of water. The toluene solvent was removed by vacuum distillation, and the desired product was distilled at 160°-190° C. at 0.5 mm. Hg. It had the following physical properties: $n_d{}^{25°}=1.4790$; and Acid No.=0.028. It comprised about 48%, by weight of, isopropylphenyl tridecyl carbonate and about 52%, by weight, of phenyl tridecyl carbonate.

EXAMPLE 15

This Example presents the plasticizer volatility data, film weight loss and 24 hour viscosity data for a number of compositions containing an alkyl aralkyl carbonate plasticizer and dioctyl phthalate.

| Plasticizer | $C_3/\phi$** Ratio | Plasticizer Volatility (% wt. loss) | | |
| --- | --- | --- | --- | --- |
| | | 3 hrs. | 24 hrs. | 7 days |
| Example 10 | 0.5 | 12.8 | — | — |
| Example 6 | 0.5 | 11.5 | — | — |
| Example 7 | 0.5 | 12.6 | — | — |
| Example 11 | 0.96 | 5.0 | 32.0 | 99 |
| Example 11* | 0.96 | 5.8 | 27.8 | 93 |
| Example 12 | 0.96 | 1.3 | 10.5 | 50.8 |
| Example 13 | 0.5 | 2.5 | 19.7 | 88.5 |
| Example 14 | 0.5 | 0.9 | 4.8 | 28.0 |
| Dioctyl Phthalate | 0.5 | 0.1 | 0.65 | 3.7 |

| Plasticizer | 2 hrs. | 24 hrs. | 24 hour Plasticizer Viscosity (poises) |
| --- | --- | --- | --- |
| Example 10 | — | — | — |
| Example 6 | 3.5 | 11.4 | 25/13[1] |
| Example 7 | — | — | — |
| Example 11 | 2.7 | 15.0 | 25/10[2] |
| Example 11* | 2.1 | 10.8 | 25/12[2] |
| Example 12 | 4.2 | 12.9 | 50/40[2,3] |
| Example 13 | 6.2 | 19.8 | 20/10[1] |
| Example 14 | 1.6 | 11.7 | 25/15[2] |
| Dioctyl | 0.3 | 2.0 | 80/45[2] |

-continued

| Phthalate |
|---|

*the carbonate ester composition prepared by Example 11 was redistilled at 139°–151° C. at 0.5 mm. Hg.
**this expresses the respective mole ratios of propylene and phenol that were reacted to form the phenol composition that was used in forming the carbonate ester compositions that were tested as plasticizers.
[1] showed no exudation.
[2] showed exudation.
[3] tested at 120 hours.

(COMPARATIVE) EXAMPLE 16

This Example illustrates the preparation of a composition comprising isopropylphenyl isobutyl carbonate and phenyl isobutyl carbonate which is not part of the present invention.

The following reagents were added to a suitable reaction vessel:

| Reagent | Amount |
|---|---|
| Phenol Composition* | 120 gm. |
| Triethylamine | 7.38 gm. |
| Calcium hydroxide | 69.63 gm. |
| Toluene | 363 gm. |

*comprised about 47.1%, by weight, of phenol and about 52.9% of an isopropylphenol mixture (28.6% ortho-; 7.2% meta- and para-; 6.9% 2,6 di-; 6.3% 2,4 di-; 1.2% 2,5 and 3,5 di-; and 2.7% 2,4,6 tri-)

To this mixture was then added in dropwise fashion 136.5 gm. of isobutyl chloroformate at 15°–20° C. over a period of about 40 minutes. The reaction mixture was then mixed for one additional hour and was allowed to stand over a weekend. The mixture was filtered, and the filter cake was washed with a few milliliters of toluene. The toluene solvent that remained was removed by distillation. The product was distilled at 79° C. to 115° C. at 0.15 mm Hg., and had the following physical properties: $n_d^{26°} = 1.4805$; $d_{25} = 1.0$; APHA Color=15; Acid No.=0.10. It comprised about 53%, by weight, of isopropylphenyl isobutyl carbonate and about 47%, by weight, of phenyl isobutyl carbonate.

(COMPARATIVE) EXAMPLE 17

The composition made in accordance with the process described in Example 16 was used as a plasticizer in forming a calendered vinyl chloride film as described in Example 4. The following physical properties were noted for the film:

| Property | Film Containing the Comp. of Ex. 16 |
|---|---|
| Clash-Berg Temp (°C.) | −11 |
| Tensile Strength (kg/cm$^2$) | 215 |
| % Elongation at Break | 247 |
| Shore "A" Hardness | 81 |

The composition showed a weight loss of 93%, by weight, when heated at 104° C. for three hours.

EXAMPLE 18

This Example illustrates the preparation of phenyl isodecyl carbonate.

Phenol (564 gm., 6.0 moles), and 37.6 gm. of a dried anionic resin (AMBERLITE IRA-400 brand) were added to a 2000 ml. flask equipped with a stirrer, thermometer and dry ice condenser. The charge was heated to 100° C. and 707 gm. (7.1 moles) of phosgene was added to the charge during a nine hour period. The phosgene addition was discontinued upon obtaining a heavy phosgene reflux in the dry ice condenser. The dry ice was then allowed to evaporate once the excess phosgene was vented into a caustic trap. The charge was filtered in order to remove the catalyst. The filtrate was then placed in a ROTOVAC apparatus and was heated to 50° C./20 mm. Hg in order to remove residual gases. The crude phenylchloroformate product (927.5 gm.) was vacuum distilled through a 15.24 cm.×2.54 cm.×0.64 cm. glass packed column to give 875 gm. of distillate having a boiling point of 59°–60° C./5.0 mm. Hg. Gas chromatographic analysis showed it to have a purity of 99.4%.

Phenylchloroformate (156.5 gm., 1.0 mole) and isodecyl alcohol (158 gm., 1.0 mole) were added to a 500 ml. 3-neck flask fitted with a stirrer, thermometer, heating mantle, reflux condenser, nitrogen purge and an aqueous trap for gaseous HCl by-product. The charge was gradually heated from 22° to 185° C. for 107 minutes, during which 32 gm. of HCl was evolved. The charge was kept at 185° C. for an additional 45 minutes. The crude ester was kept at 185° C. for an additional 45 minutes. It had an acid number of 2.8 mg. KOH/gm. This crude ester was then vacuum distilled through a 15.24 cm.×2.54 cm.×0.64 cm. column packed with helical glass to give 250 gm. of a colorless liquid having the following properties:

| | |
|---|---|
| Boiling Point (°C.)/mm | = 135–185°/0.10 |
| $n_d^{25°}$ | = 1.4747 |
| $d_{25}$ | = 0.96 |
| Acid No. | = 0.11 |
| Reflux Acid No. | = 0.0 |
| Infrared Scan | = Carbonyl band at 1760 cm$^{-1}$ |

EXAMPLE 19

This Example illustrates the formation of para-t-butyl phenyl isodecyl carbonate.

Isodecyl alcohol (790 gm., 5.0 moles) was charged to a 2 liter flask equipped with a stirrer, thermometer, dry ice condenser, and cooling bath. The charge was cooled to about 10° C. and 520 gm. (5.25 moles) of phosgene was added within five hours while 184.5 gm. (5.05 moles) of hydrogen chloride was collected in the caustic trap. After the addition of phosgene, the charge was allowed to warm to room temperature with the simultaneous slow addition of nitrogen in order to purge the system of residual phosgene and hydrogen chloride gases. All vent gases were collected in an aqueous caustic trap. The isodecylchloroformate was filtered, was not distilled, and weighed 1086 gm.

Para-t-butyl phenol (300 gm., 2.0 moles) and pyridine (79.1 gm., 2.1 moles) were added to 500 ml. of toluene. The charge was mixed and 441 gm. of isodecyl chloroformate (2.0 moles) was slowly added at a pot temperature of 10° C. The addition took approximately three hours during which the pyridinium hydrochloride salt precipitated. The charge was then filtered to remove this salt, and the filtrate was washed with 2 liters of a 1% HCl solution, a 1% caustic solution, and water until neutral to a pH of 7. The toluene solvent was removed under vacuum to yield 653 gm. of a crude ester that was vacuum distilled. The distillate (627 gm.) had the following properties:

| | |
|---|---|
| Boiling Point (°C.)/mm | = 164°–173°/0.05 |
| $n_d^{25°}$ | = 1.4803 |
| $d_{25}$ | = 0.94 |
| Acid No. | = 0.10 |
| Reflux Acid No. | = 0.0 |
| Infrared Scan | = Carbonyl band at 1760 cm$^{-1}$ |

EXAMPLE 20

This Example illustrates the formation of phenyl 2-ethylhexyl carbonate.

Phenylchloroformate from Example 18 (313 gm., 2.0 moles) and 2-ethylhexanol (130 gm., 2.0 moles) were added to a one liter reactor. The charge was mixed and gradually heated from 23° to 180° C. during a four hour period, and 69 gm. of HCl was collected in the aqueous trap. The crude ester had an acid number of 4.5. The ester (498 gm.) was vacuum distilled and had a boiling point of 132°–134.5° C./0.05 mm. to produce 464 gm. of distillate having the following properties:

| | |
|---|---|
| Acid No. | = 0.10 |
| Reflux Acid No. | = 0.0 |
| $n_d^{25°}$ | = 1.4750 |
| $d_{25}$ | = 0.97 |
| Infrared Scan | = Carbonyl band at 1760 cm$^{-1}$ |

EXAMPLE 21

This Example illustrates the formation of a composition comprising isopropylphenyl isodecyl carbonate and phenyl isodecyl carbonate using a tetramethylurea catalyst.

The phenol composition used in Example 13 (160 gm., 1.0 mole) and 2.3 gm. of tetramethylurea catalyst was phosgenated at 100° C. with 150 gm. of gaseous phosgene. The addition of phosgene was discontinued when a heavy reflux of phosgene was observed in the dry ice condenser. The excess phosgene was allowed to dissapate into a caustic trap by introducing a gentle nitrogen bleed into the reactor after removal of the dry ice from the condenser. The crude intermediate, isopropylphenyl chloroformate was stripped of gaseous products at 60° C./100 mm. Hg to give a purified intermediate (176.3 gm.) that analyzed 99.5% by gas chromatography.

In the second step of the process, 176.3 gm. of the intermediate was added to isodecyl alcohol (158 gm., 1.0 mole). This mixture was mixed and heated from 25° to 180° C. during 24 hours, and 32.1 gm. of HCl was collected in the aqueous trap. The crude ester (296.7 gm.) having an acid number of 0.28 was vacuum distilled to give 257.3 gm. of a product having the following properties:

| | |
|---|---|
| Boiling Point (°C.)/mm. | = 128°–148° C./0.10 |
| $n_d^{25°}$ | = 1.4753 |
| $d_{25}$ | = 0.95 |
| Acid No. | = 0.10 |
| Infrared Scan | = Carbonyl band at 1760 cm$^{-1}$ |

EXAMPLE 22

This Example illustrates the synthesis of a composition comprising isopropylphenyl isodecyl carbonate and phenyl isodecyl carbonate using a pyridine catalyst.

To a mixture of the phenol composition of Example 13 (726 gm.), pyridine (498 gm., 6.3 moles) and 1500 ml. of toluene was slowly added at 10° C., isodecylchloroformate (1323 gm., 6.0 moles). The addition took about three hours. After reaction, the precipitated salt was removed by filtration. The filtrate underwent the following washes: an aqueous HCl wash containing 50 gm. of concentrated HCl in 2 liters of water; two 2-liter water washes; a 1% caustic wash (2 liters); and two 2-liter water washes until neutral to a pH of 7. The toluene was removed on a ROTOVAC apparatus, and the crude ester was vacuum distilled to give 1548.6 gm. of product having the following properties:

| | |
|---|---|
| Boiling Point (°C.)/mm. | = 136–171°/0.25 |
| $n_d^{25°}$ | = 1.4787 |
| $d_{25}$ | = 0.97 |
| Acid No. | = 0.04 |
| APHA Color | = 25 |
| Infrared Scan | = Carbonyl band at 1760 cm$^{-1}$ |

EXAMPLE 23

This Example illustrates the evaluation of the alkyl aryl carbonate esters prepared in Examples 18 to 22 as plasticizers for vinyl chloride polymer compositions. The plastisol comprised 100 parts by weight PVC, 60 parts by weight of the carbonate ester, and 2 parts by weight of a heat stabilizer. The following results were obtained:

| | Plasticizer Volatility* % wt. loss at 104° C. | | |
|---|---|---|---|
| Plasticizer | 3 hours | 24 hours | 7 days |
| Example 18 | 3.3 | 25.3 | 100.0 |
| Example 19 | 0.5 | 3.4 | 44.8 |
| Example 20 | 14.6 | 90.2 | 100.0 |
| Example 21 | 4.2 | 17.2 | 96.7 |
| Example 22 | 2.2 | — | — |

| | Brookfield Viscosity of Plastisol (poise) | | |
|---|---|---|---|
| Plasticizer | Initial | 2 hours | 24 hours |
| Example 18 | 20/8 | 20/8 | 20/10 |
| Example 19 | 300/60 | 50/40 | 50/40 |
| Example 20 | 15/5 | 15/5 | 20/10 |
| Example 21 | 25/8 | 25/8 | 25/10 |
| Example 22 | 20/10 | 20/10 | 25/12 |

*volatility of sample before use as plasticizer

The plastisols were fused at 204° C. to form films which were then observed for film exudation.

| Plasticizer | Film Exudation at Ambient Temperature |
|---|---|
| Example 18 | None |
| Example 19 | Exudation |
| Example 20 | None |
| Example 21 | None |
| Example 22 | None |

EXAMPLE 24

This Example shows synthesis of a composition comprising iosopropylphenyl isodecyl carbonate and phenyl isodecyl carbonate using a pyridine catalyst. The process of Example 22 was utilized.

EXAMPLE 25

This Example shows synthesis of a composition comprising isopropylphenyl iodecyl carbonate and phenyl isodecyl carbonate using a tetramethyl urea catalyst. The process of Example 21 was used.

EXAMPLE 26

This Example shows synthesis of isopropylphenyl isodecyl carbonate using an anionic resin catalyst.

The phenol composition of Example 13 (115.8 gm., 1.0 mole) was added to 23 gm. of an anionic resin (AMBERLITE IRA-400 from Rohm and Haas. This mixture was heated to 100° C. and gaseous phosgene (122 gm., 1.2 moles) was added over a 64 minute period. HCl byproduct (36.5 gm.) was collected in an aqueous trap. The charge was allowed to cool to 25° C. and was filtered in order to remove the catalyst. Gas chromatographic analysis revealed that the product was 99.72% pure.

In the second step, 178.3 gm. (1.0 mole) of the intermediate product from the preceding step was added to 158 gm. (1.0 mole) of isodecyl alcohol. The resulting mixture was stirred and heated from 25° to 180° C. in 4 hours during which 34.4 gm. of HCl was collected. The crude ester had an acid number of 0.43.

The crude ester was vacuum distilled through a 15.24 cm.×2.54 cm.×0.64 cm. column packed with helical glass to give 258 gm. of a colorless ester having the following properties:

| | |
|---|---|
| Boiling Point (°C.)/mm. = | 133°–151°/0.10 |
| $n_d^{25°}$ = | 1.4760 |
| Acid No. = | <0.1 |
| $d_{25}$ = | 0.96 |
| Infrared Scan = | Carbonyl band at 1760 cm$^{-1}$ |

EXAMPLE 27

This Example shows the evaluation data for the esters prepared by the methods of Examples 24–26. The test procedure for exudation, viscosity and volatility are given in Example 23. The coal tar stain resistance test is described in Example 3.

| Example No. | Exudation | | |
|---|---|---|---|
| 24 | None | | |
| 25 | None | | |
| 26 | Yes | | |

| Example No. | Brookfield Viscosity No. 6 (2/20 rpm) (poise) | | |
|---|---|---|---|
| 24 | 20/10 | 20/10 | 20/10 |
| 25 | 25/8 | 25/8 | 25/10 |
| 26 | 10/8 | 15/8 | 20/8 |

| | Volatility (104° C.)-%* | | |
|---|---|---|---|
| Example No. | 3 hrs. | 24 hrs. | Coal Tar Stain |
| 24 | 2.5 | 19.7 | Pass |
| 25 | 4.2 | 17.2 | Pass |
| 26 | 3.4 | 21.2 | Pass |

*volatility of sample before use as plasticizer.

EXAMPLE 28

This Example shows the synthesis of t-butylphenyl isodecyl carbonate using an anionic resin catalyst.

A mixture of a phenol composition comprising 30.9% phenol, 64.0% of meta and para-t-butyl phenol, 2.7% di-t-butyl phenyl, and 2.4% ortho-t-butyl-phenyl (6.0 moles) and 35 gm. of anhydrous anionic resin (AMBERLITE-400 from Rohm and Haas) was added to a 2-liter reactor fitted with a dry ice condenser, heating mantle, stirrer, thermometer, HCl trap and gas inlet tube. The charge was mixed and heated to 100° C., and gaseous phosgene (740 gm.) was added during an eight-hour period. The phosgene was added at a controlled rate in order to minimize phosgene reflux. The end of the reaction was indicated by a heavy phosgene reflux in the dry ice condenser. At the end of the reaction, the dry ice was removed and the unused phosgene was vented into a caustic trap. Nitrogen gas was also bubbled into the solution to assist in the removal of residual gases. The charge was filtered and the filtrate was placed in a ROTOVAC apparatus in order to remove the residual gases such as phosgene and HCl.

The intermediate t-butylphenyl-chloroformate (1138 gm.) was vacuum distilled through a 15.24 cm.×2.54 cm.×0.64 cm. column with glass packing to give 1065 gm. of distillate having a boiling point of 70°–80° C./0.05 mm. Hg.

In the second step, 1065 gm. (5.6 moles) of the intermediate was added to 900.6 gm. of isodecyl alcohol (5.7 moles). The charge was heated from 25° C. to 180° C. during a 6-hour period. The charge was also kept at 120° C. for several hours to insure the complete reaction. A total of 188 gm. of HCl was collected in the aqueous trap.

The crude ester (1789 gm.) having an acid number of 2.52 was vacuum distilled to yield 1377 gm. of product having the following properties.

| | |
|---|---|
| Boiling Point (°C.)/mm. = | 135–165°/0.10 |
| $n_d^{25°}$ = | 1.4760 |
| APHA Color = | 15 |
| Acid No. = | 0.10 |
| Infrared Scan = | Carbonyl band at 1760 cm$^{-1}$ |

EXAMPLE 29

This Example shows the synthesis of t-butylphenyl isodecyl carbonate using tetramethyl urea as a catalyst.

The phenol composition used in Example 28 (2.0 moles) was added to 5.0 gm. of tetramethyl urea, and the charge was phosgenated with 257 gm. of phosgene at 100° C. After reaction, the excess phosgene was vented into a caustic trap. The intermediate t-butylphenyl-chloroformate (378 gm.) was vacuum distilled to give 350 gm. of intermediate having a boiling point of 60°–98° C./ca. 5.0 mm Hg.

In the next step, 350 gm. of the intermediate (1.84 moles) was added to 291 gm. of isodecyl alcohol (1.84 moles). The charge was mixed and gradually heated from 25° to 180° C. during a 6-hour period during which time 62 gm. of HCl was collected in the aqueous trap. The crude product (569 gm.) was vacuum distilled to give 508 gm. of product having the following properties:

Boiling Point (°C.)/mm. = 130–163°/0.15
$n_d^{25°}$ = 1.4762
Acid No. = 0.10
Infrared Scan = Carbonyl band at 1760 cm$^{-1}$

EXAMPLE 30

This Example shows the Brookfield viscosity volatility, and coal tar stain data for the esters prepared in Examples 19, 28 and 29.

| Plasticizer | Brookfield Viscosity RVF No. 6 Spindle: 2/20 rpm (poise) | | |
|---|---|---|---|
| | Initial | 2 hours | 24 hours |
| Example 19 | 300/60 | 50/40 | 50/40 |
| Example 28 | 140/48 | 30/33 | 30/31 |
| Example 29 | 150/35 | 100/35 | 70/30 |

| Example No. | Volatility (104° C.)-%* | | Coal Tar Stain |
|---|---|---|---|
| | 3 hrs. | 24 hrs. | |
| 19 | 0.5 | 3.4 | Pass |
| 28 | 2.4 | 11.2 | Pass |
| 29 | — | — | Pass |

*volatility before use as plasticizer.

All esters exuded from films prepared in accordance with the description given in Example 27.

The foregoing Examples are merely illustrative of certain embodiments of the present invention and should not be construed in a limiting sense. The scope of protection that is sought is set forth in the claims which follow.

What is claimed:

1. A carbonate ester of the formula:

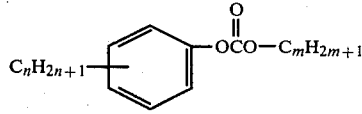

where n is an interger of from 0 to 4, m is an interger of from 8 to 14.

2. An ester as claimed in claim 1 which is isopropylphenyl 2-ethylhexyl carbonate.

3. An ester as claimed in claim 1 which is phenyl 2-ethylhexyl carbonate.

4. An ester as claimed in claim 1 which is isopropylphenyl isodecyl carbonate.

5. An ester as claimed in claim 1 which is phenyl isodecyl carbonate.

6. An ester as claimed in claim 1 which is isopropylphenyl tridecyl carbonate.

7. An ester as claimed in claim 1 which is phenyl tridecyl carbonate.

8. A carbonate ester composition which consists essentially of at least one compound of the formula:

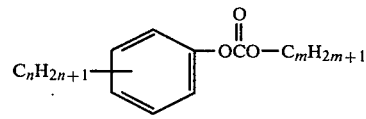

where n is an integer of from 0 to 4, m is an integer of from 8 to 14.

9. A composition as claimed in claim 8 which consists essentially of isopropylphenyl 2-ethylhexyl carbonate.

10. A composition as claimed in claim 8 which consists essentially of phenyl 2-ethylhexyl carbonate.

11. A composition as claimed in claim 8 which consists essentially of isopropylphenyl isodecyl carbonate.

12. A composition as claimed in claim 8 which consists essentially of phenyl isodecyl carbonate.

13. A composition as claimed in claim 8 which consists essentially of isopropylphenyl tridecyl carbonate.

14. A composition as claimed in claim 8 which consists essentially of phenyl tridecyl carbonate.

15. A plasticized vinyl chloride polymer composition comprising a vinyl chloride polymer and an effective amount for plasticization of the ester of either claim 1, 2, 3, 4, 5, 6, or 7.

16. A plasticized vinyl chloride polymer composition comprising a vinyl chloride polymer and an effective amount for plasticization of the composition of either claim 8, 9, 10, 11, 12, 13 or 14.

17. A composition as claimed in claim 15 comprising vinyl chloride polymer and from about 5% to about 50%, by weight of the polymer, of the ester.

18. A composition as claimed in claim 16 comprising vinyl chloride polymer and from about 5% to about 50%, by weight of the polymer, of the composition.

* * * * *